2 Sheets: Sheet 1.

Original Patent Dated Nov. 20, 1866

James B. Forsyth.

Impd. Roller for Clothes Wringers.

4243

REISSUED JAN 31 1871

Witnesses:-
Wm. H. Royce
Baltis De Long

2518
A

Inventor:-
James B. Forsyth
by his Atty
Wm. D. Baldwin

James B. Forsyth.

Impd. Roller for Clothes Wringers.

2518
A
SINGLE

Witnesses:-
Wm. H. Rowe
Baltis De Long.

Inventor:-
James B. Forsyth
by his Atty
Wm. D. Baldwin

UNITED STATES PATENT OFFICE.

JAMES B. FORSYTH, OF BOSTON, MASSACHUSETTS.

IMPROVEMENT IN RUBBER ROLLS FOR CLOTHES-WRINGERS.

Specification forming part of Letters Patent No. 59,798, dated November 20, 1866; Reissue No. 4,243, dated January 31, 1871.

*To all whom it may concern:*

Be it known that I, JAMES B. FORSYTH, of Boston, in the county of Suffolk and State of Massachusetts, have invented certain Improvements in Rollers for Clothes Wringers, Washers, &c., of which the following is a full, clear, and exact description, reference being had to the accompanying drawings, making part of this specification, in which—

Figure 1:
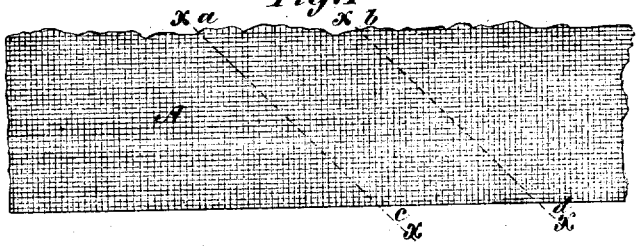
Figure 2:
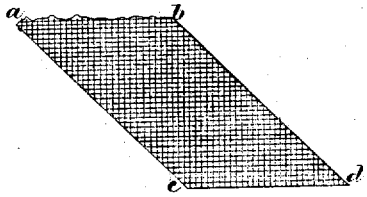
Figure 3:
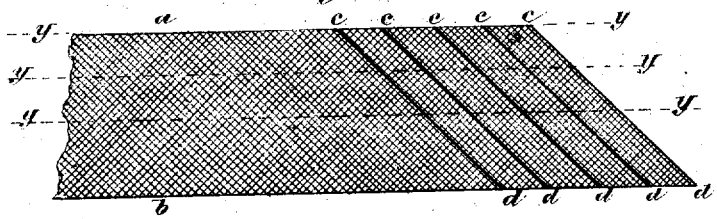
Figure 4:
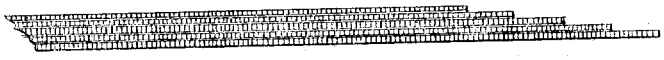
Figure 5:
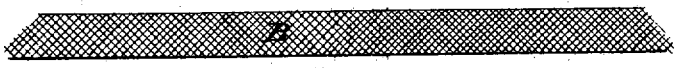
Figure 6:
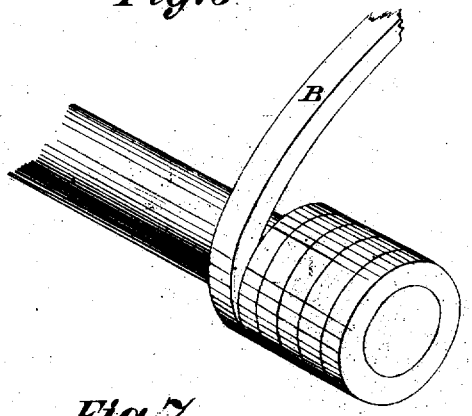
Figure 7:
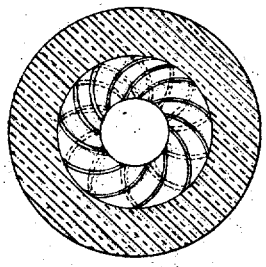

Figure 1 is a plan of a sheet of rubber and cloth as it comes from calendering-roll. Fig. 2 represents a strip of the sheet of rubber and cloth cut in the direction of the lines *x x*, Fig. 1. Fig. 3 is a plan of several of these strips placed on each other. Fig. 4 is a vertical section on the line *y y* of Fig. 3. Fig. 5 is a plan of a narrow band cut from the material as arranged in Fig. 3, the width of the band being equal to the distance between the lines *y y*. Fig. 6 represents a mandrel with the narrow band wound around it. Fig. 7 is a transverse vertical section through a wringer-roll, the core of which is formed from the band in the manner shown in Fig. 6.

My invention is an improvement upon rollers formed by curing a vulcanizable compound in which fibers are mixed; and it consists in arranging these fibers so that they will extend through the rubber radially from the shaft, and its object is to cause the fibers to act more efficiently in toughening and strengthening the stock, and in preventing the roller from turning on its shaft. The best way known to me of so arranging the fibers is that I now decribe.

In the drawings, A is a sheet of cloth with a thin layer of the vulcanizable compound upon each side of it. This sheet A is cut "bias," or diagonally across the length of the fiber, as shown by the lines *x x*, Fig. 1, forming long strips, *a b c d*, (one of which is seen broken in Fig. 2,) which are now placed upon each other, as seen in Fig. 3, a roller being employed to press each strip upon the one beneath it, so that the surfaces of rubber may be securely cemented and permanently united. The several strips thus united form a sheet of the thickness shown in section, Fig. 4, which is then cut into strips or bands B, Fig. 5, of any suitable width to admit of their being easily wound around a mandrel or the shaft of the roller, (see Fig. 6,) in such manner that the fibers of the cloth will radiate from the mandrel or shaft.

The roll is then made up to the desired size by winding rubber sheets around it, first applying a coat of rubber cement, and, after being wrapped in cloth or metal or placed in molds, it is then subjected to the vulcanizing process, the rubber in its soft and plastic state filling up all the inequalities around and between the layers of the core, and thoroughly binding and incorporating the parts together.

By arranging the fibers as above described, so that they will lie nearly at right angles to the surface of the shaft, as seen in Fig. 7, instead of laying the warp or filling upon it in a direction nearly concentric therewith, or, in other words, so that the fibers shall radiate from the shaft instead of being wound around it or intermixed with the rubber surrounding the shaft without regard to direction, the tenacity of the roll and the degree of adhesion of the parts are much increased, and the position of the fiber is better adapted to resist any tendency of the roll to become loose and turn on its shafts when subjected to a strain.

The roll can be cured on a mandrel, which may be readily removed and the shaft inserted; or the roll may be cured directly on its shaft.

What I claim as my invention is—

As a new article of manufacture, a rubber roller whose interior is composed of vulcanized rubber mixed with fibers, when the fibers are arranged substantially as above described.

JAMES B. FORSYTH.

Witnesses:

JAMES WILSON,

THOMAS A. FORSYTH.